(12) United States Patent
Sheynblat

(10) Patent No.: US 6,583,756 B2
(45) Date of Patent: Jun. 24, 2003

(54) METHOD AND APPARATUS FOR USING SATELLITE STATUS INFORMATION IN SATELLITE POSITIONING SYSTEMS

(75) Inventor: Leonid Sheynblat, Belmont, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/938,076

(22) Filed: Aug. 23, 2001

(65) Prior Publication Data

US 2002/0075182 A1 Jun. 20, 2002

Related U.S. Application Data

(60) Provisional application No. 60/228,258, filed on Aug. 25, 2000.

(51) Int. Cl.$^7$ ................................................. H04B 7/185
(52) U.S. Cl. ............................... 342/357.02; 342/357.12
(58) Field of Search ....................... 342/357.01, 357.02, 342/357.06, 357.12; 701/213, 215; 455/12.1, 422

(56) References Cited

U.S. PATENT DOCUMENTS 5,883,594 A * 3/1999 Lau ........................... 342/357
6,429,808 B1 * 8/2002 King et al. ............ 342/357.02

FOREIGN PATENT DOCUMENTS

| EP | 0874248 | 10/1998 | ............. G01S/5/14 |
| WO | 9954753 | 10/1999 | ............. G01S/5/14 |
| WO | 0045191 | 8/2000 | ............. G01S/5/14 |

\* cited by examiner

*Primary Examiner*—Dao Phan
(74) *Attorney, Agent, or Firm*—Philip Wadsworth; Charles D. Brown; Bruce Greenhaus

(57) ABSTRACT

Methods and apparatuses for removing the effects of cross-correlation on a satellite positioning system's calculation of position are disclosed. The method includes receiving the SPS signals from in view SPS satellites and determining whether a first measurement, corresponding to a first SPS satellite which has been indicated to be a healthy satellite, is to be removed from a set of measurements to be used to solve for a position of a mobile SPS receiver. Determining includes testing the first measurement for a cross-correlation resulting from signals from the first SPS satellite and signals from a second SPS satellite, where the first measurement is derived from the SPS signals. In one embodiment, the signals from the first SPS satellite may be weaker than the signals from the second SPS satellite, which has been indicated to be an unhealthy satellite.

15 Claims, 7 Drawing Sheets

CELLULAR BASED INFORMATION SOURCE

| SERVICE AREA | CELL SITE # | SERVICE AREA # OR LOCATION | CELL SITE LOCATION | APPROXIMATE DOPPLER |
|---|---|---|---|---|
| A | - | LAT./LONG. A | - | DOPPLER SET A1 ($t_1$)<br>DOPPLER SET A2 ($t_2$) |
| B | 1 | LAT./LONG. B | LAT./LONG. B1 | DOPPLER SET B11 ($t_1$)<br>DOPPLER SET B12 ($t_2$) |
| B | 2 | LAT./LONG. B | LAT./LONG. B2 | DOPPLER SET B21 ($t_1$)<br>DOPPLER SET B22 ($t_2$) |

FIG. 4

METHOD AND APPARATUS FOR USING SATELLITE STATUS INFORMATION IN SATELLITE POSITIONING SYSTEMS

RELATED APPLICATION

This application is related to and hereby claims the benefit of the filing date of a provisional application by the same inventor, Leonid Sheynblat. The provisional application is entitled, Method and Apparatus for Using Satellite Status Information in Satellite Positioning Systems, Ser. No. 60/228,258, filed on Aug. 25, 2000.

FIELD OF THE INVENTION

The present invention relates generally to the field of satellite position systems (SPS), such as global positioning system (GPS) receivers, and more particularly to processing of SPS signals.

BACKGROUND OF THE INVENTION

Global Positioning System (GPS) receivers normally determine their position by computing times of arrival of signals transmitted simultaneously from a multiplicity of GPS (or NAVSTAR) satellites. These satellites transmit, as part of their message, both satellite positioning data as well as data on clock timing, so-called "ephemeris" data. The process of searching for and acquiring GPS satellites, and reading the ephemeris data for a multiplicity of satellites and computing the location of the receiver from this data is time consuming, often requiring several minutes. In many cases, this lengthy processing time is unacceptable and, furthermore, greatly limits battery life in miniaturized portable applications.

GPS receiving systems have two principal functions. The first is the computation of the pseudoranges to the various GPS satellites, and the second is the computation of the position of the receiver using these pseudoranges and satellite timing and ephemeris data. The pseudoranges are simply the times of arrival of satellite signals measured by a local clock. This definition of pseudorange is sometimes also called code phase. The satellite ephemeris and timing data is extracted from the GPS signal once it is acquired and tracked. As stated above, collecting this information normally takes a relatively long time (18 seconds to several minutes) and must be accomplished with a good received signal level in order to achieve low error rates.

Most GPS receivers utilize correlation methods to compute pseudoranges. These correlation methods are performed in real time, often with hardware correlators. GPS signals contain high rate repetitive signals called pseudorandom (PN) sequences. The codes available for civilian applications are called coarse/acquisition (C/A) codes, and have a binary phase-reversal rate, or "chipping" rate, of 1.023 MHz and a repetition period of 1023 chips for a code period of 1 millisecond. The code sequences belong to a family known as Gold codes, and each GPS satellite broadcasts a signal with a unique Gold code.

For a signal received from a given GPS satellite, following a downconversion process to baseband, a correlation receiver multiplies the received signal by a stored replica of the appropriate Gold code contained within its local memory, and then integrates, or low-pass filters, the product in order to obtain an indication of the presence of the signal. This process is termed a "correlation" operation. By sequentially adjusting the relative timing of this stored replica relative to the received signal, and observing the correlation output, the receiver can determine the time delay between the received signal and a local clock. The initial determination of the presence of such an output is termed "acquisition." Once acquisition occurs, the process enters the "tracking" phase in which the timing of the local reference is adjusted in small amounts in order to maintain a high correlation output. The correlation output during the tracking phase may be viewed as the GPS signal with the pseudorandom code removed, or, in common terminology, "despread." This signal is narrow band, with a bandwidth commensurate with a 50 bit per second binary phase shift keyed (BPSK) data signal which is superimposed on the GPS waveform.

The correlation acquisition process is very time consuming, especially if received signals are weak. To improve acquisition time, most GPS receivers utilize a multiplicity of correlators which allows a parallel search for correlation peaks.

Conventional GPS receiving equipment is typically designed to receive GPS signals in open spaces since the satellite signals are line-of-sight and can thus be blocked by metal and other materials. Improved GPS receivers provide signal sensitivity that allows tracking GPS satellite signals indoors, or in the presence of weak multipath signals or signals that are pure reflections. The ability to acquire such weak GPS signals, however, typically causes other problems. For example, the simultaneous tracking of strong and weak signals may cause the receiver to lock on to a cross-correlated signal, which is not a true signal. Instead of finding a weak true peak, a stronger cross-correlated peak may be acquired. Tracking a weak satellite signal does not guarantee that it is a direct signal. This weak signal may be a reflected signal or a combination of direct and indirect signals. The combined signals are referred to as multipath signals. The path of the reflected signal is typically longer than the path of the direct signal. This difference in path length causes the time-of-arrival measurement of the reflected signal to be typically delayed or the corresponding code phase measurement to contain a positive bias. In general, the magnitude of the bias is proportional to the relative delay between the reflected and direct paths. The possible absence of a direct signal component makes the existing multipath mitigation techniques (such as a narrow correlator or a strobe correlator) obsolete.

The GPS navigation message is the information transmitted to a GPS receiver from a GPS satellite. It is in the form of the 50 bit per second data stream that is modulated on the GPS signals.

The data message is contained in a data frame that is 1500 bits long. It has five subframes each of which contains GPS system time. Each subframe consists of 10 words of 30 bits each. Subframes 1 through 3 are repeated every 30 seconds. There are twenty-five pages of data appearing in sequence in the fourth and fifth subframes; one every 30 seconds. Thus, each of these twenty-five pages repeats every 750 seconds.

Subframes 4 and 5 contain two types of health or status data for the GPS satellites: (a) each of the 32 pages which contain the clock/ephemeris related almanac data provide an eight-bit satellite health status word regarding the satellite whose almanac data they carry, and (b) the $25^{th}$ page of subframe 4 and 5 jointly contain six-bit health status data for up to 32 satellites. Additional satellite health data are given in subframe 1. Subframe 1 is part of the ephemeris data set.

Typically, a GPS receiver will receive information concerning the status (e.g. "health") of a satellite and then process the GPS signals by not acquiring and not tracking unhealthy satellites while it acquires and tracks GPS signals from healthy satellites. Alternatively, standalone GPS receivers can be designed to acquire and track healthy and unhealthy satellites but avoid using unhealthy signals in the location computation after having read the health status data from the ephemeris message from an unhealthy satellite's signal. No attempt has been made in the prior art to use the information concerning the health of a satellite in attempting to avoid using cross-correlation results or to detect such results. In addition, no attempt has been made to ensure that the satellite health status is made available to GPS receivers having no direct access to the satellite health status. (Direct access is from SPS satellites or from previously downloaded data from the SPS satellites).

SUMMARY OF THE INVENTION

A method is presently described for processing satellite position system (SPS) signals. The method includes receiving the SPS signals from in view SPS satellites and determining whether a first measurement, corresponding to a first SPS satellite which has been indicated to be a healthy satellite, is to be removed from a set of measurements to be used to solve for a position of a SPS receiver. This determining includes testing the first measurement for a cross-correlation resulting from signals from the first SPS satellite and signals from a second SPS satellite. In one embodiment, the signals from the first SPS satellite may be weaker than the signals from the unhealthy second SPS satellite.

In "view" as used herein is defined broadly to mean SPS satellites in view of: a SPS reference receiver; a network of SPS reference receivers; a mobile SPS receiver; or a cell or a group of cells of a cellular radio system. However, these are merely provided as examples. Therefore, it should be noted that an SPS satellite may be considered to be "in view" if the signals can be received by virtually any SPS receiver.

A computer readable medium containing executable computer program instructions is also disclosed. The computer medium causes the data processing system to perform a method for processing satellite positioning system (SPS) signals when the program instructions are executed by a data processing system. The method includes attempting to acquire SPS signals from all in view SPS satellites regardless of whether the in view SPS satellites are unhealthy, and receiving health data specifying which of the in view SPS satellites are unhealthy. The method includes testing measurements obtained from acquiring SPS signals, for all of the in view SPS satellites, for a cross-correlation between two different SPS satellites, where the testing is performed regardless of whether an in view SPS satellite is unhealthy.

A combined SPS receiver and communications system is also disclosed. In one embodiment, a satellite position system (SPS) reference receiver is configured to receive SPS signals from a plurality of in view SPS satellites. A server is configured to communicate with the SPS reference receiver. A transmitter coupled with the SPS reference receiver transmits the SPS signals. In one embodiment, the server analyzes the in view SPS satellite's signals for a cross-correlation condition where a healthy SPS satellite's signal is influenced by an unhealthy SPS satellite's signal, the unhealthy SPS satellite's signal(s) and the cross-correlated satellite's signal(s) are then tested to determine if they should be removed, corrected, or used before a location is computed from the in view SPS satellites. The transmitter then optionally transmits the location.

Another embodiment of the disclosed apparatus includes a mobile SPS receiver coupled to a second receiver. The mobile SPS receiver receives the SPS signals from the transmitter on the second receiver and analyzes the in view SPS satellites for a cross-correlation condition where a healthy SPS satellite's signal is influenced by an unhealthy SPS satellite's signal, the unhealthy SPS satellite's signal and the cross-correlated SPS satellite's signal is removed or corrected before a location is computed from the in view SPS satellites by the mobile SPS receiver. In one embodiment, the transmitter and the second receiver is compatible with a cellular radio system.

In another embodiment, a computer readable medium containing executable computer program instructions performs a method for providing assistance data to a mobile satellite positioning system (SPS) receiver which is coupled to a receiver. The method may include determining a cell site or a group of cell sites which is in communication with the receiver. Health data is determined for each of a plurality of in view SPS satellites and the health data is transmitted to the receiver.

BRIEF DESCRIPTION OF THE DRAWINGS

The present invention is illustrated by way of example and is not limited in the figures of the accompanying drawings, in which like references indicate similar elements.

FIG. 4 shows a representation of a cellular based information source which provides an association between sets of Doppler information at given times relative to cellular service areas and/or cellular sites.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those skilled in the art to practice the invention. The following detailed description is, therefore, not to be taken in a limiting sense, and the scope of the invention is defined only by the appended claims.

A method and an apparatus for using satellite status information in SPS systems are disclosed. In one exemplary embodiment, a mobile SPS receiver receives SPS signals from in view SPS satellites and determines (or attempts to determine) pseudoranges to all (in most cases) in view satellites. Information concerning the status of the satellites (e.g. satellite health) is also collected and this information is used in processing the SPS signals received by the mobile SPS receiver. Since, in most cases, the mobile SPS receiver determines code phases/pseudoranges to all satellites (even for unhealthy satellites) it is possible to determine a cross-correlation between a healthy satellite's weak GPS signal and an unhealthy satellite's strong GPS signal. Once such a cross-correlation result is identified it may be possible to remove a cross-correlated measurement or attempt to correct it. Thus, according to one embodiment, a mobile SPS determines code phase/pseudorange measurements to satellites which are known to be unhealthy.

The satellite's health information may be monitored by GPS reference receiver(s) that transmit this information to GPS server(s) (e.g. see the location servers described in co-pending U.S. patent application Ser. No. 08/842,559, filed Apr. 15, 1997, now U.S. Pat. No. 6,208,290, which is hereby incorporated herein by reference) and these servers may cause this information for all in view satellites to be either (a) used locally to process pseudorange measurements received from a mobile GPS receiver (in the case where the mobile GPS receiver does not compute the mobile's position but the location server, or other system in a network, does compute the position) or (b) transmitted to the mobile GPS receiver (through for example a cellular telephone which is coupled to and housed with the mobile GPS receiver) for use by the mobile GPS receiver. The GPS reference receivers typically, according to this embodiment, acquire and track all GPS satellites in view whether healthy or unhealthy; this will allow in one embodiment for the detection (by a location server or by a mobile GPS receiver itself) of cross-correlations between healthy and unhealthy satellite signals.

Figure 2:
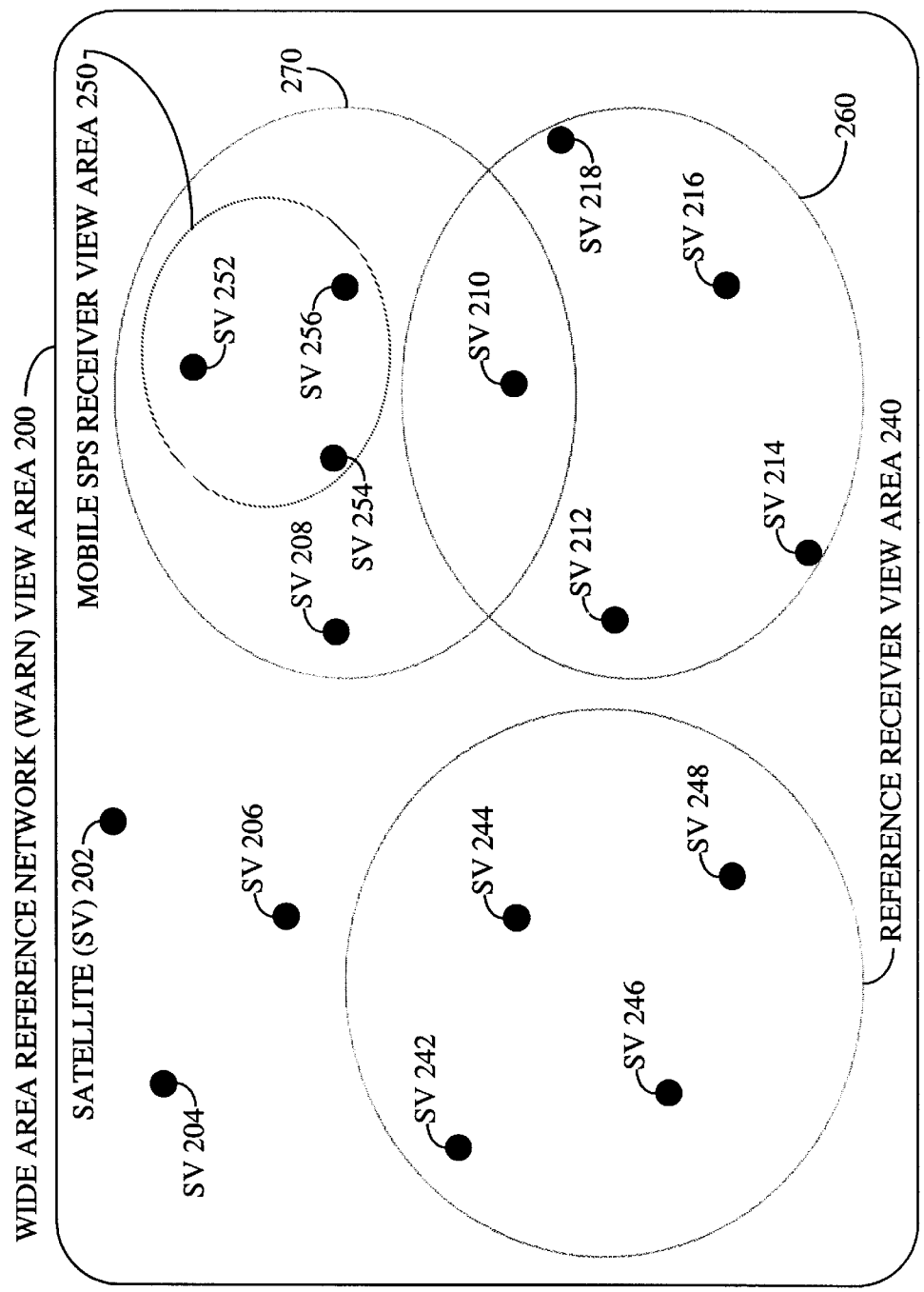
FIG. 2 illustrate a variety of "in view" satellite position system (SPS) satellites.

"In view," as used in this detailed description is intended to be flexible. Accordingly, "in view satellites" or "in view SPS satellites" can be used to denote in view of the entire Wide Area Reference Network (WARN) or any subset of the WARN. For example, a non-exclusive list would include in view of a single SPS reference receiver, in view of a plurality of SPS reference receivers, in view of a mobile SPS receiver, in view of a cell or any group of cells of a cellular (wireless) radio network. Various "in view SPS satellites" are shown in FIG. 2. With reference to FIG. 2, wide area reference network view area 200 is shown where satellites (SV) 202, SV 204, SV 206, SV 208, SV 210, SV 212, SV 214, SV 216, SV 218, SV 242, SV 244, SV 246, SV 248, SV 252, SV 254, and SV 256 are in view of the WARN. A subset of these satellites are in view of reference receiver view area 240, e.g., SV 242, SV 244, SV 246, and SV 248. Another subset of theses satellites are in view of a second reference receiver view area 260, e.g., SV 210, SV 212, SV 214, SV 216, and SV 218. Another subset of these satellites are in view of a third reference receiver view are 270, e.g., SV 208, SV 210, SV 252, SV 254, and SV 256. Another subset of satellites is in view of mobile SPS receiver view area 250, e.g., SV 252, SV 254, and SV 256. No limitation is implied by the selection of the satellites included in the view area 240, 250, 260, or the view area 270 or the size of the view areas. The view areas were chosen for illustration purposes only.

In one embodiment, the health status of "All" SPS satellites in view of the WARN view area 200 are acquired. A subset of the satellite's health information, could be transmitted to a mobile SPS receiver based on the satellites "in view" of the mobile SPS receiver's location. "All" SPS satellites used herein depends on the particular implementation of acquisition. For example, taking into account an elevation mask, or a signal-to-noise ratio mask on a signal to interface mask, etc. Thus "all" is flexible constructed. The GPS reference receiver(s) may collect satellite status information which is more current than the corresponding information in the satellite ephemeris (or almanac) information, and this updated status information may be transmitted to the location servers and/or the mobile GPS receivers for use according to the various embodiments of the invention. In one embodiment, the health status information may be received directly from the satellite. In another embodiment, the location server(s) may derive an updated status information based on the information and/or measurements received from the GPS reference receiver(s). The updated status information may be a function of the quality of status (QoS) associated with the location request. For a given level of quality, the location server may determine that a satellite which is marked healthy in the ephemeris and/or almanac data may not provide the desired level of accuracy. In such a case, the location server may update its health status information and send it to the remote SPS receiver(s) and optionally store it for further processing. An example of this processing may be the use of this updated health status to determine if the satellite should be used in position computation, which is performed in the location server. Alternatively, the determination and update of the health status information may be performed by the mobile SPS receiver. An example of a network of GPS reference receivers which may be used to supply this updated status information is described in co-pending U.S. patent application Ser. No. 09/067,407, filed Apr. 28, 1998, now U.S. Pat. No. 6,215,441, which is hereby incorporated herein by reference.

Figure 3:
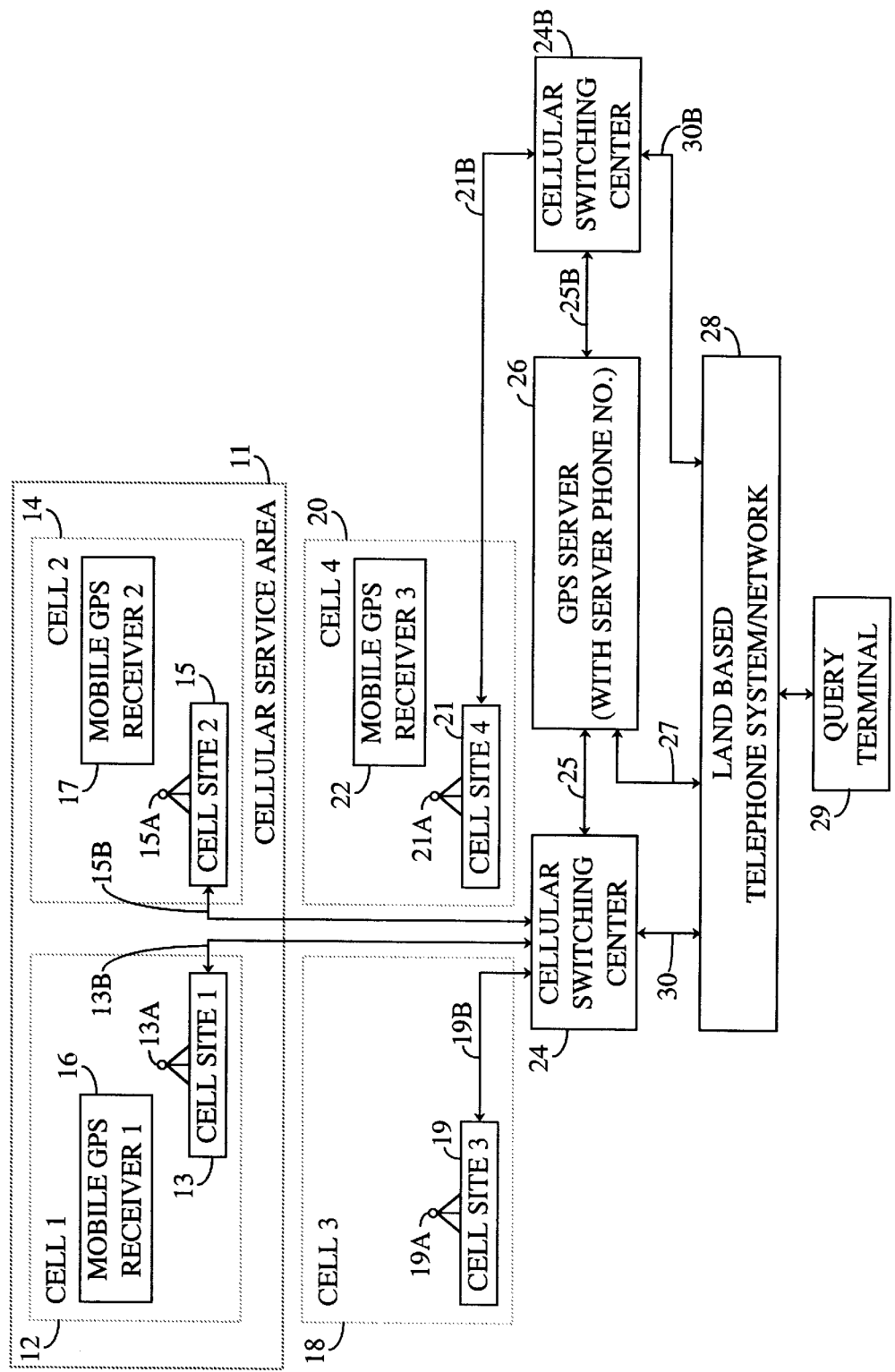
FIG. 3 illustrates a cellular communication system having a plurality of cells each of which is serviced by a cell site, and each of which is coupled to a cellular switching center.
Figure 5:
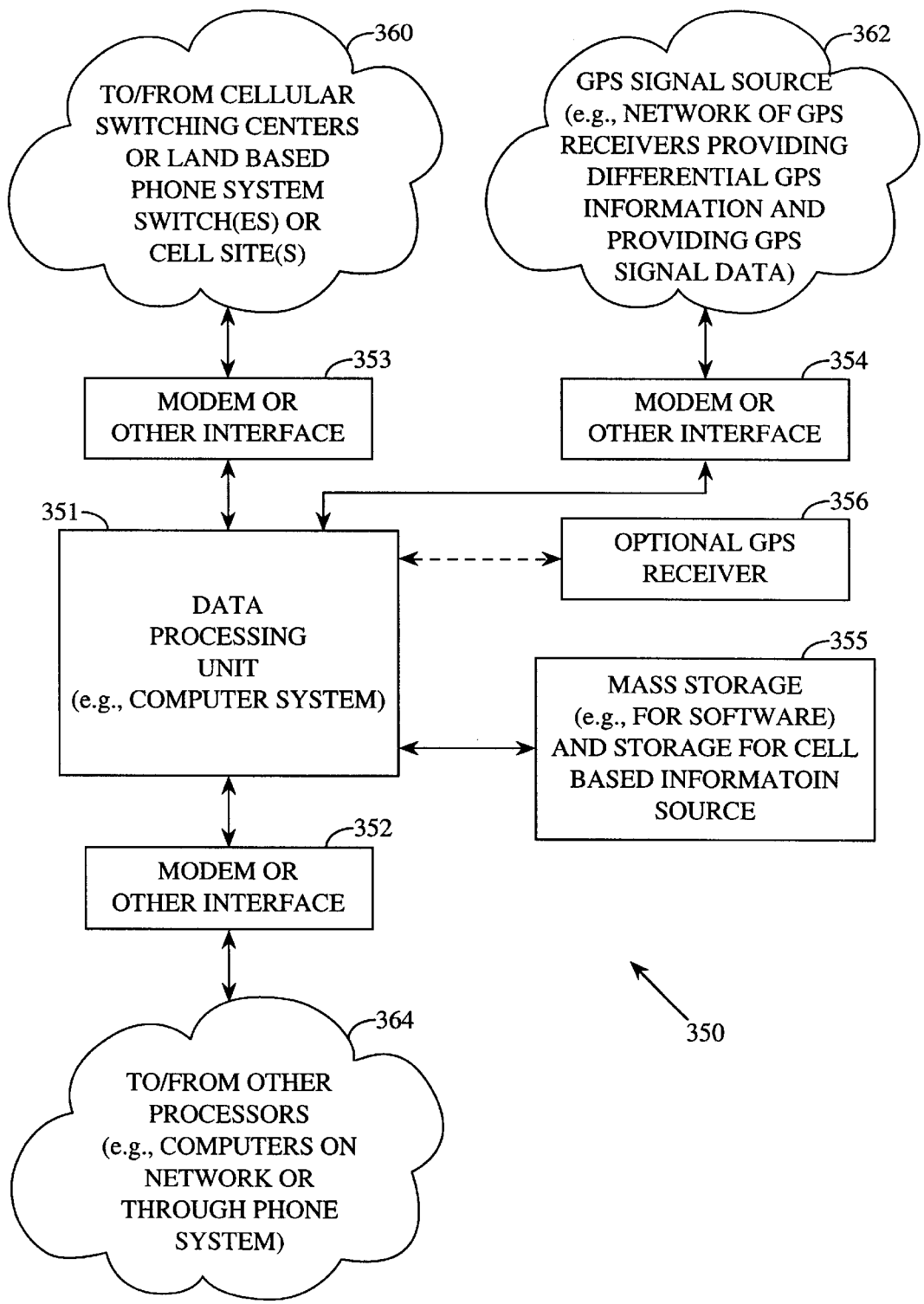
FIG. 5 illustrates an implementation of a basestation system according to one embodiment of the present invention.

FIGS. 1, 5, 6, and 7A from U.S. Pat. No. 6,208,290 have been included herein for clarity and correspond to FIGS. 3, 4, 5, and 6 respectively. With reference to the figures herein, FIG. 3 illustrates several cells within a cellular service area where the mobile SPS receiver may receive assistance data from a communications network. In one embodiment, the communications network includes a location server, which can be represented by 26 in FIG. 3. FIG. 4 may also contain satellite health status information (not shown) transmitted to the mobile SPS receiver by the communications network. For example, an SPS receiver in one view area may receive one set of satellite health status information and an SPS receiver in another view area may receive another set of satellite health status information from the communication system. A base station illustrated in FIG. 5 may be associated with the reference receiver view areas shown in FIG. 2 and support the communications system including cells within the cellular service area.

Figure 6:
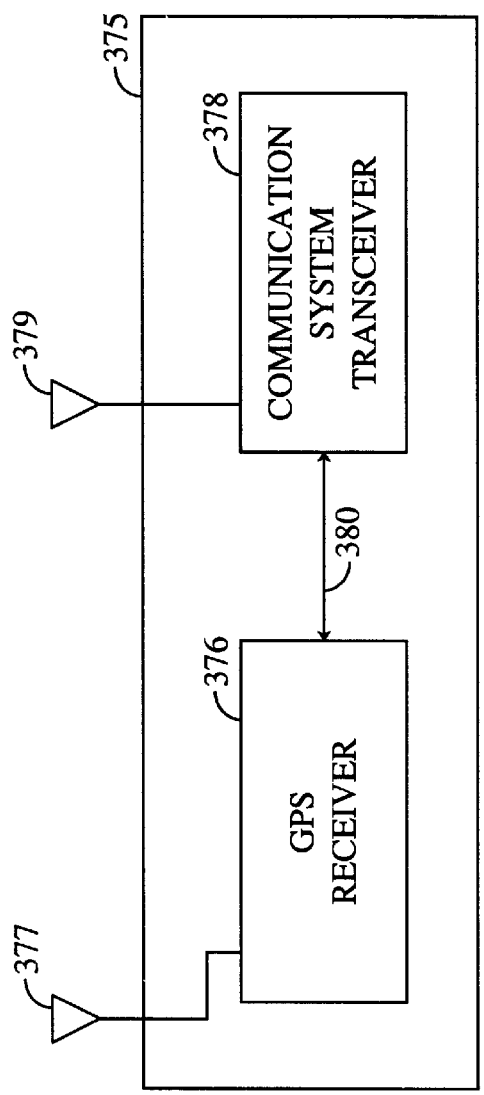
FIG. 6 illustrates an example of a combined SPS receiver and communication system according to one embodiment of the present invention.

In one embodiment, FIG. 6 illustrates a cell phone 375, which couples a mobile SPS receiver 376 with a communications system transceiver 378 to receive the assistance information including satellite health status from the communications system. In one embodiment, the location server determines a cell site or group of cell sites that is in communication with mobile SPS receiver 376, based on the cell site or group of cell sites. A group of in view satellites may then be determined by the location server and health information for all such in view satellites may then be transmitted to cell phone 375 and be received by the communications transceiver 378. Mobile SPS receiver 376 may compute its location based on the assistance data received or the location server may determine the location of the mobile SPS receiver.

The health data given in subframes 1, 4 and 5 of some satellites may differ from that shown in subframes 4 and/or 5 of another group of satellites since the latter may be updated at a different time.

Health summary in subframe 5 is only updated at the time of almanac upload. During extended operations the health summary may become outdated due to the length of time since the last upload.

This situation is even more exacerbated when the GPS receiver is indoors or in other signal restrictive environments. It may require as much as 17 dB of additional signal sensitivity to be able to receive the satellite health status bits directly from the satellites. The GPS receiver may measure the pseudorange to the satellites based on the signal which is 17 dB weaker than the signal which contains the satellite health status bits (50 bits per second). Reception of satellite health status bits may also require continuous satellite signal tracking from 18 seconds to several minutes which is not generally possible in signal restrictive environments. Several critical performance aspects related to GPS radiolocation may be affected by outdated or unavailable satellite health information. One aspect is related to the use of unhealthy satellite signal(s) in location determination. It is commonly known that the use of the unhealthy satellite signal(s) may result in significant positional errors.

If the health summary becomes stale and does not accurately reflect the status of the GPS constellation, the time-to-first-fix (TTFF) for a GPS receiver may be delayed. This is due to the time wasted on the possible acquisition of unhealthy satellites which were marked "healthy" by the stored health summary. Also, attempts to acquire healthy satellites which are marked unhealthy may not be made. As a result, extended operations without timely and correct satellite health information updates may jeopardize missions of those users who require efficient TTFF. A fast TTFF is critical for emergency services and also affects the battery standby and talk times. In a wireless assisted GPS mode, a wireless network may provide timely and correct satellite health information for all mobile GPS receivers communicating with such network.

Another reason for satellite health assistance is the protection against rogue satellite measurements. In the heavily obstructed signal environments, it's quite often that the GPS satellite signals are received with a very high dynamic range. Receiving GPS signals with signal strengths differing by more than approximately 17 dB may cause a GPS receiver to acquire a cross-correlated signal instead of a relatively weaker true signal. One procedure that may be used to detect and possibly correct or remove a cross-correlated measurement is described in co-pending U.S. patent application Ser. No. 09/241,334, filed Feb. 1, 1999, which is hereby incorporated herein by reference. However, for a GPS receiver to detect a presence of cross-correlated signals, all signals from both healthy and unhealthy satellites should be acquired. A problem would arise if a strong "unhealthy" satellite signal cross-correlates with a weak "healthy" satellite signal. Unaware of the presence of an "unhealthy" signal, a GPS receiver may not be able to detect a cross-correlation condition. Another problem may arise if only a subset of all visible satellites is acquired irrespective of the health status. If any of the acquired satellites in this subset exhibit weak signal behavior, then it may also be the case that the cross-correlation condition may go undetected.

In one embodiment of this invention, GPS reference receiver(s) which provides reference data for location server(s) (also referred to as a Position Determination Entity (PDE) in CDMA cellular phone systems and Serving Mobile Location Centre (SMLC) in the GSM cellular phone systems) acquires and tracks all satellites in view: healthy and unhealthy. Further, GPS technologies (e.g. a GPS receiver) integrated with or connected to wireless devices (e.g. a cellular telephone or a two-way pager) also acquire and track all satellites in view: healthy and unhealthy. In a wireless assisted GPS (WAG) mode (e.g. see examples described in co-pending U.S. patent application Ser. No. 08/842,559, filed Apr. 15, 1997), location server(s) may provide a "health" status information to the mobiles communicating with a wireless network served by the location server(s). This health status information may accompany any other assistance information provided by the location server(s). In general, assistance information allows fast acquisition of GPS signals in highly restrictive signal environments. In order to achieve such performance improvements, assistance information may specify the satellites to be searched for, the estimated time of arrival of these signals and the expected frequency (Doppler) of the signals. This assistance information may be provided to improve a 3-dimensional search for a satellite signal. Other types of assistance such as ephemeris and/or almanac, approximate location and time information may be provided to assist with location computation and/or fast acquisition of satellite signals. When the satellite's signals are acquired, pseudoranges, Dopplers and other satellite signal measurements are analyzed for cross-correlation conditions. In order to perform this analysis, the assistance should be provided and the measurements should be made for all satellites in view: healthy and unhealthy. In this embodiment, the satellite health information is used to assist detection of a cross-correlation condition and then the cross-correlated and/or analyzed to determine whether they should be included in the location computation process or corrected. In an alternate embodiment, where the assistance information is provided for healthy satellites only (satellite health is implied by inclusion of the particular satellite in the satellite list) and the current and valid satellite health status information is not available to the mobile GPS receiver, the mobile may attempt to acquire only healthy satellites (e.g., the satellites included in the list). In this case, a possible presence of a "strong" unhealthy satellite potentially cross-correlating with relatively weaker healthy satellites may not be known to the mobile and therefore may not be tested for. The information related to the current satellite constellation (including the list of visible satellites and health status) may not be known since it cannot not be guaranteed that the GPS receiver will have the necessary information, which is current and available (e.g., stored in its memory). The use of undetected cross-correlated signals may lead to large positional errors thus affecting the quality of the location service.

The following example provides an illustration of the present invention. The data was collected in an urban canyon with a resulting horizontal positional error of 61.4 meters. Satellite SV PRN#10 (line 2 of Table 1) was removed from the solution since it was identified as a cross-correlation with satellite SV PRN #17 (line 3 of Table 1). If satellite SV PRN#10 was used in the solution, the error in its pseudorange measurement of −37,903 meters would have caused a horizontal error in access of 50 kilometers.

This example also illustrates the need to provide assistance information for all satellites in view. If satellite SV PRN#17 had been declared unhealthy and the wireless network did not provide the assistance for all four satellites, the mobile GPS receiver would have been unable to detect the cross-correlation and would have used satellite SV PRN#10 thereby introducing the horizontal error in excess of 50 kilometers, described above, into the position estimate of the mobile GPS receiver, an unacceptable result.

TABLE 1

Cross-Correlation Between Satellites SV PRN 17 and SV PRN 10

| SV PRN | Azimuth (degrees) | Elevation (degrees) | Output SNR (dB) | Error (meters) | Used in solution |
|---|---|---|---|---|---|
| 6  | 128 | 63 | 49 | −1.1    | Yes |
| 10 | 44  | 8  | 14 | −37903  | No  |
| 17 | 330 | 65 | 52 | −0.6    | Yes |
| 22 | 295 | 28 | 19 | 92.2    | Yes |

Alternatively, health information may be (or may have been) directly received from the satellites and this health information may be used in the same manner described herein as the health information which is received from a transmitter at a cell site.

The health information may be transmitted from a cell site by broadcasting this information for all satellites in view of a cellular telephone basestation ("cell site"). Alternatively, it may be provided to a cellular telephone upon request (on demand). The health information may be transmitted from the cellular telephone basestation to the cellular telephone which then provides the health information to a GPS receiver which is coupled to the cellular telephone. In the case where the information is transmitted on demand, a location server may determine the appropriate (e.g. updated health) information based upon a cell site which is in cellular radio/wireless communication with the phone and the cell site information may be used to determine an approximate location which is used to determine satellites in view of that location and the updated health information for these satellites is then caused to be transmitted (in one case) to the cellular telephone which in turn provides the information to the mobile GPS receiver for use in processing SPS signals in the GPS receiver. Processing SPS signals may include cellular telephone' position determination. In another case, the location server may retain the updated health information or information used to determine the updated health information and use it to process the pseudoranges (e.g. correlation measurements which specify code phases) received from the mobile GPS receiver in order to determine the position of the mobile GPS receiver. In both cases, pseudoranges, estimated Doppler and other measurements are determined even for known unhealthy GPS satellites so that cross-correlations can be detected as described herein. For example, a GPS receiver may receive the updated health information from a cell site but still acquire GPS signals from a GPS satellite which was indicated to be unhealthy in the transmitted updated health information. In the example, where the GPS receiver may also compute the location information it may use the updated health information to determine which satellites may be used in the solution. Co-pending U.S. application Ser. No 08/842,559, filed Apr. 15, 1997, describes a method for identifying a cell site which is in wireless communication with a cellular telephone and which then determines satellite assistance data for in view satellites based upon an approximate location derived from identifying this cell site. This method may be used with the present invention where the satellite assistance data in this case is either satellite health (e.g. based on satellite almanac) or updated satellite health (e.g. more current than the existing satellite almanac message's information concerning satellite health).

Figure 1A:
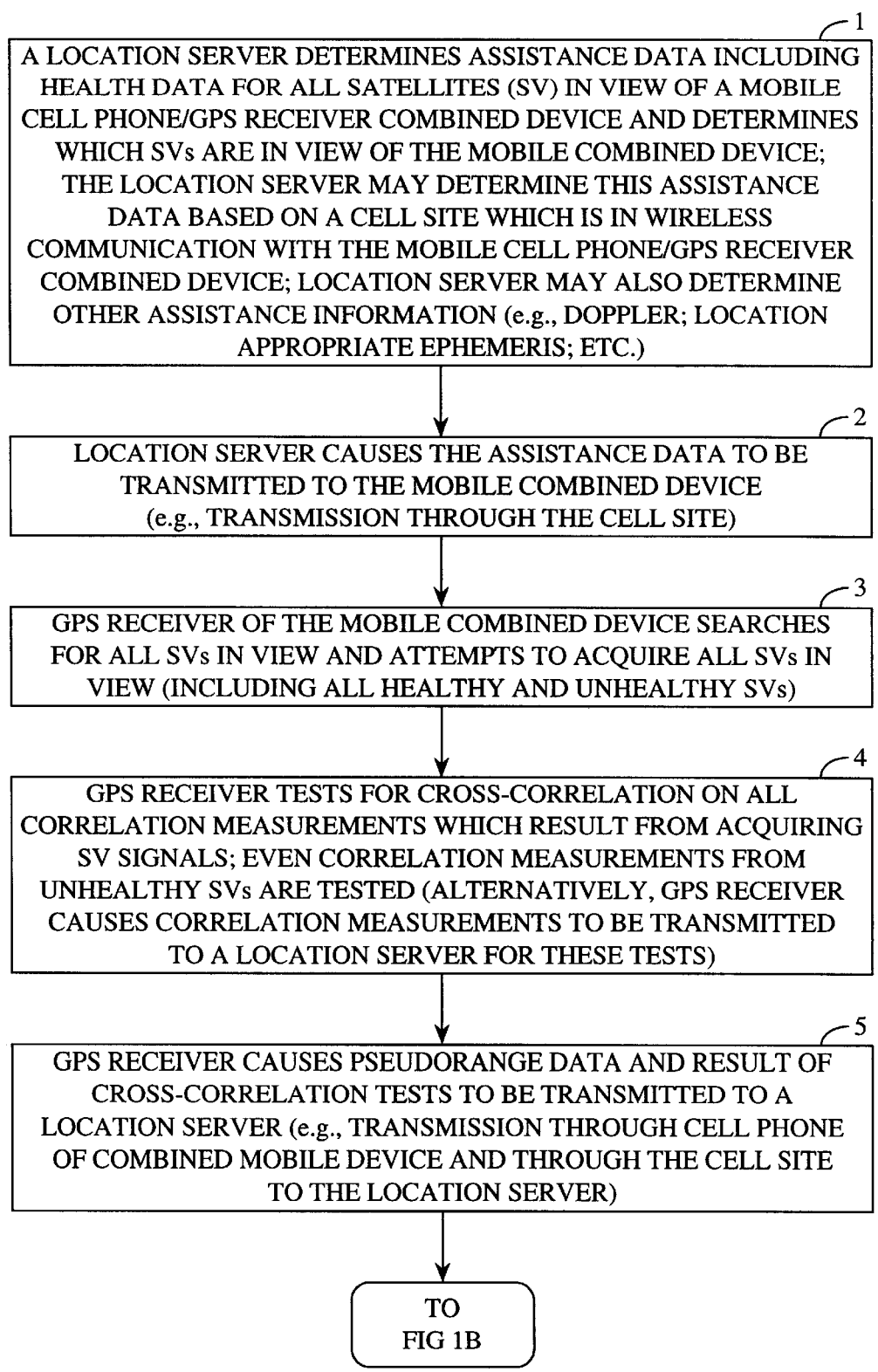
FIG. 1 illustrates a method to use satellite position system (SPS) status data to improve a position calculation.
Figure 1B:
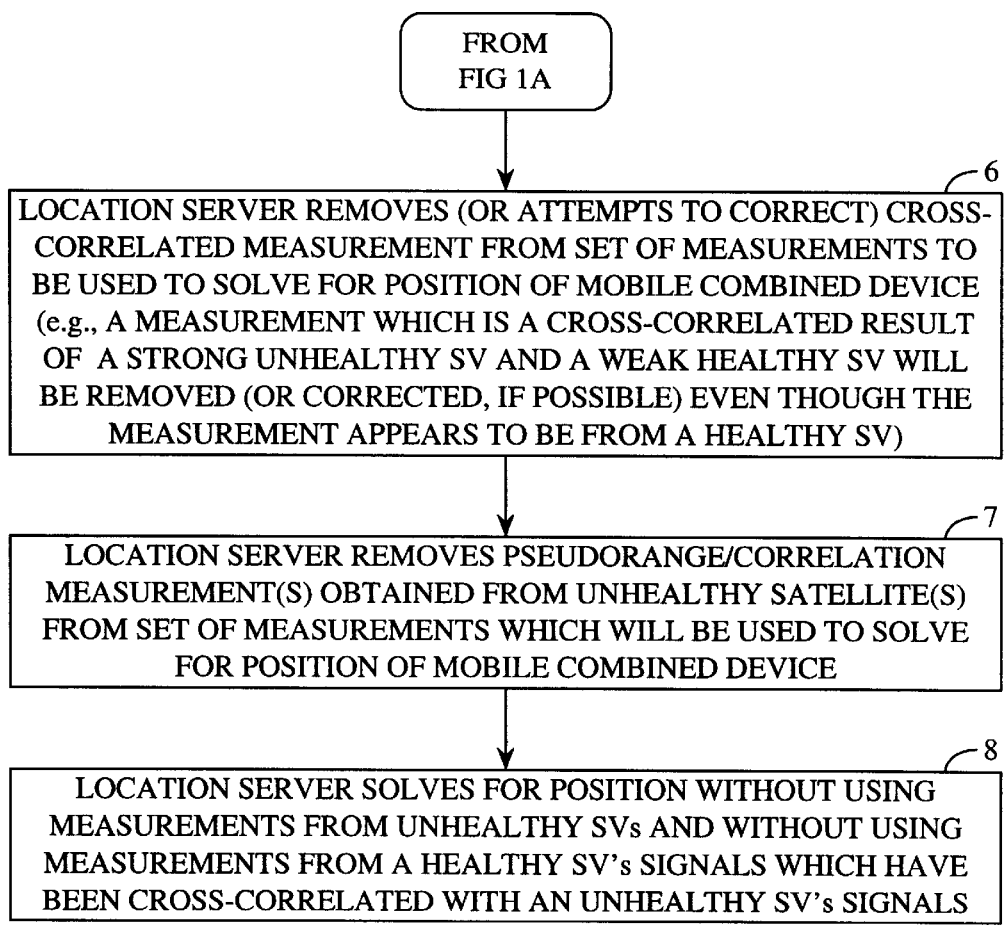

FIG. 1 shows an example according to one embodiment of the present invention. In this example, the location server provides assistance data to the mobile GPS receiver and then receives measurements back from the mobile SPS receiver, and these measurements are then used to solve for the position of the mobile GPS receiver. The method shown in FIG. 1 assumes a certain sequence in which the location server provides assistance data through a cell site to the mobile device, and then the mobile device attempts to acquire all satellites in view, including all healthy and unhealthy satellites in view, and then tests for cross-correlations on all of the correlation measurements which result from acquiring the satellite signals. It will be appreciated that a different sequence of operations may also be employed in accordance with the present invention. For example, the GPS receiver can attempt to acquire all satellites in view before receiving the assistance data. Further, the testing for cross-correlation may be performed at the location server after the GPS receiver determines pseudorange data and transmits this data and other data necessary for the testing for cross-correlation back to the location server which can then perform the cross-correlation tests. In another alternative embodiment, the mobile device may perform its own position calculations and thus operations 6, 7, and 8 of FIG. 1 are performed by a processing unit in the combined cell phone/GPS receiver device. In this case, operation 5 in which data is transmitted to the location server is not necessary. In yet another alternative embodiment, the location server may broadcast the appropriate health assistance data rather than providing it on request to a mobile device. In this case, broadcasting may be performed from selected cell site(s) and no location server may be necessary except for the processor(s) located at the cell site(s) which determines the necessary health assistance data based upon the satellites in view at the cell site. This approach may also be applicable to on-demand delivery described herein.

While satellite health information may be obtained from receiving, demodulating and decoding the health data in the SPS signals from the SPS satellites, and used according to the various embodiments of the invention, it is also possible to use GPS receivers and processing systems which monitor (e.g. receive and measure characteristics of the SPS signals) the SPS signals and determine from measured characteristics of the SPS signals that an SPS satellite is unhealthy (even though the demodulated and decoded health data in the SPS signals from this satellite or other satellites indicate that this satellite is healthy) or vice versa.

In this discussion, embodiments of the present invention have been described with reference to application in the United States Global Positioning System (GPS) system, which is an example of an SPS system. It should be evident, however, that these methods are equally applicable to other satellite positioning systems, such as the Russian Glonass system. Thus, the term "GPS" used herein includes such alternative satellite positioning systems, including the Russian Glonass system. Likewise, the term "GPS signals" includes signals from alternative satellite positioning systems.

Furthermore, although embodiments of the present invention are described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band (or other frequency) carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings, urban canyons, or other enclosed areas. The term "satellite", as used herein, is intended to include pseudolites or equivalents of pseudolites, and the term GPS signals, as used herein, is intended to include GPS-like signals from pseudolites or equivalents of pseudolites.

It will be appreciated that the methods described in conjunction with the figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Thus, a novel method and apparatus for using satellite status data is described. Although the invention is described herein with reference to specific preferred embodiments, many modifications therein will readily occur to those of ordinary skill in the art. Accordingly, all such variations and modifications are included within the intended scope of the invention as defined by the following claims.

What is claimed is:

1. A method for processing satellite positioning system (SPS) signals, the method comprising:
    attempting to acquire SPS signals from in view SPS satellites regardless of whether the in view SPS satellites are unhealthy;
    receiving health data specifying which of the in view SPS satellites are unhealthy;
    testing measurements obtained from acquiring the SPS signals, for all of the in view SPS satellites, for a cross-correlation between at least two different SPS satellites, wherein the testing is performed regardless of whether an in view SPS satellite is unhealthy.

2. The method of claim 1 further comprising:
    removing from a set of measurements a first measurement, corresponding to a first SPS satellite, wherein the set of measurements, after the removing, is to be used to solve for a position of a mobile SPS receiver, and wherein the first measurement is determined to be removed by the testing.

3. The method of claim 2, wherein the first SPS satellite has been indicated to be a healthy satellite.

4. The method of claim 1 further comprising:
    analyzing a first measurement, corresponding to a first SPS satellite which has been indicated to be a healthy satellite, to determine whether to remove the first measurement from a set of measurements or correct the first measurement for use in the set of measurements, wherein the set of measurements is to be used to solve for a position of a mobile SPS receiver, and wherein the first measurement is selected for the analyzing as a result of the testing.

5. The method of claim 1, wherein the in view SPS satellites are in view of at least one of a SPS reference receiver, a network of SPS reference receivers, the mobile SPS receiver, a cell cellular radio system, and a group of cells of a cellular radio system.

6. A computer readable medium containing executable computer program instructions, which when executed by a data processing system, cause the data processing system to perform a method for processing satellite positioning system (SPS) signals, the method comprising:
    attempting to acquire SPS signals from in view SPS satellites regardless of whether the in view SPS satellites are unhealthy;
    receiving health data specifying which of the in view SPS satellites are unhealthy;
    testing measurements obtained from acquiring the SPS signals, for all of the in view SPS satellites, for a cross-correlation between two different SPS satellites, wherein the testing is performed regardless of whether an in view SPS satellite is unhealthy.

7. The computer readable medium of claim 6, wherein the method further comprises:
    removing from a set of measurements a first measurement, corresponding to a first SPS satellite which has been indicated to be a healthy satellite, wherein the set of measurements, after the removing, is to be used to solve for a position of a mobile SPS receiver, and wherein the first measurement is determined to be removed by the testing.

8. The computer readable medium of claim 6, wherein the method further comprises:
    analyzing a first measurement, corresponding to a first SPS satellite which has been indicated to be a healthy satellite, to determine whether to remove the first measurement from a set of measurements or correct the first measurement for use in the set of measurements, wherein the set of measurements is to be used to solve for a position of a mobile SPS receiver, and wherein the first measurement is selected for the analyzing as a result of the testing.

9. The computer readable medium of claim 6, wherein the in view SPS satellites are in view of at least one of SPS a reference receiver, a network of SPS reference receivers, the mobile SPS receiver, a cell of a cellular radio system, and a group of cells of a cellular radio system.

10. An apparatus comprising:
    a mobile satellite position system (SPS) receiver to receive SPS signals; and
    a receiver coupled with the mobile SPS receiver, wherein the mobile SPS receiver receives the SPS signals from a transmitter and analyzes in view SPS satellites for a cross-correlation condition wherein a healthy SPS satellite's signal is influenced by an unhealthy SPS satellite's signal, the unhealthy SPS satellite's signal and the cross-correlated SPS satellite's signal being removed or corrected before a location is computed from the in view SPS satellites by the mobile SPS receiver.

11. An apparatus to receive satellite position system (SPS) signals from a server comprising:

a mobile SPS receiver to receive the SPS signals; and a receiver coupled with the mobile SPS receiver, wherein the server analyzes in view SPS satellites for a cross-correlation condition wherein a healthy SPS satellite's signal is influenced by an unhealthy SPS satellite's signal, the unhealthy SPS satellite's signal and the cross-correlated SPS satellite's signal being removed or corrected before a location is computed from the in view SPS satellites by the server.

12. The apparatus of claim 10, wherein the receiver is compatible with a cellular radio system.

13. A method for processing satellite positioning system (SPS) signals, the method comprising:

attempting to acquire SPS signals from all SPS satellites in view of a mobile SPS receiver regardless of whether the SPS satellites are unhealthy;

receiving health data specifying which SPS satellites in view of the mobile SPS receiver are unhealthy;

testing, for all SPS satellites in view, measurements obtained from acquiring SPS signals for a cross-correlation between two different SPS satellites, wherein the testing is performed regardless of whether an SPS satellite in view is unhealthy.

14. The method of claim 13, further comprising:

removing from a set of measurements a first measurement, corresponding to a first SPS satellite which has been indicated to be a healthy satellite, wherein the set of measurements, after the removing, is to be used to solve for a position of the mobile SPS receiver, and wherein the first measurement is determined to be removed by the testing.

15. The method of claim 13, further comprising:

analyzing a first measurement, corresponding to a first SPS satellite which has been indicated to be a healthy satellite, to determine whether to remove the first measurement from a set of measurements or correct the first measurement for use in the set of measurements, wherein the set of measurements is to be used to solve for a position of the mobile SPS receiver, and wherein the first measurement is selected for the analyzing as a result of the testing.

* * * * *